( 12 ) United States Patent
Tabourin et al.

(10) Patent No.: US 11,064,544 B2
(45) Date of Patent: Jul. 13, 2021

(54) MOBILE COMMUNICATION SYSTEM AND PRE-AUTHENTICATION FILTERS (71) Applicant: RADIO IP SOFTWARE INC., Longueuil (CA)

(72) Inventors: Patrick Tabourin, Montreal (CA); Richard Girardin, St-Basile le Grand (CA); Francis Latulippe, Mont-St-Hilaire (CA)

(73) Assignee: RADIO IP SOFTWARE INC., Longueuil (CA)

( * ) Notice: Subject to any disclaimer, the term of this patent is extended or adjusted under 35 U.S.C. 154(b) by 264 days.

(21) Appl. No.: 15/746,680

(22) PCT Filed: Jul. 25, 2016

(86) PCT No.: PCT/CA2016/050872
§ 371 (c)(1),
(2) Date: Jan. 22, 2018

(87) PCT Pub. No.: WO2017/015752
PCT Pub. Date: Feb. 2, 2017

(65) Prior Publication Data
US 2018/0220477 A1 Aug. 2, 2018

Related U.S. Application Data (60) Provisional application No. 62/196,545, filed on Jul. 24, 2015.

(51) Int. Cl.
*H04L 29/06* (2006.01)
*H04W 76/12* (2018.01)
(Continued)

(52) U.S. Cl.
CPC .......... *H04W 76/12* (2018.02); *H04W 12/03* (2021.01); *H04W 12/062* (2021.01); *H04W 88/16* (2013.01); *H04L 63/0272* (2013.01)

(58) Field of Classification Search
CPC ..... H04W 12/02; H04W 12/06; H04W 76/12; H04W 88/16
See application file for complete search history.

(56) References Cited

U.S. PATENT DOCUMENTS 7,669,218 B1 * 2/2010 Groff ................. H04N 5/44513
  713/168
8,687,612 B2   4/2014 Menaceur et al.
(Continued)

FOREIGN PATENT DOCUMENTS

WO    2010078654    7/2010

OTHER PUBLICATIONS

International Search Report of corresponding PCT application No. PCT/CA2016/050872.

*Primary Examiner* — Jeffrey C Pwu
*Assistant Examiner* — Thong P Truong
(74) *Attorney, Agent, or Firm* — Lavery, De Billy, LLP; Hugh Mansfield (57) ABSTRACT

A method and system is disclosed for providing applications and devices in a mobile part access to communications between the mobile part and a fixed part and such that prior to completion of authentication of the mobile part with the fixed part certain types of communications between the mobile part and the fixed part are supported by a service connection not requiring completion of authentication. The types of communications able to use the service connection are provided to the mobile part in the form of a pre-authentication filter.

21 Claims, 5 Drawing Sheets

(51) Int. Cl.
*H04W 12/03* (2021.01)
*H04W 12/062* (2021.01)
*H04W 88/16* (2009.01)

(56) References Cited

U.S. PATENT DOCUMENTS

| | | | |
|---|---|---|---|
| 2002/0010866 A1* | 1/2002 | McCullough | H04L 63/164 |
| | | | 726/3 |
| 2004/0082362 A1* | 4/2004 | Peng | H04W 52/0277 |
| | | | 455/556.2 |
| 2004/0171369 A1* | 9/2004 | Little | G06Q 10/107 |
| | | | 455/410 |
| 2005/0044350 A1* | 2/2005 | White | G06F 21/606 |
| | | | 713/151 |
| 2010/0100952 A1* | 4/2010 | Sample | H04L 67/22 |
| | | | 726/9 |
| 2011/0090794 A1* | 4/2011 | Cherian | H04W 36/0027 |
| | | | 370/235 |
| 2011/0194541 A1* | 8/2011 | Menaceur | H04W 40/246 |
| | | | 370/338 |
| 2014/0198644 A1* | 7/2014 | Basilier | H04W 28/0252 |
| | | | 370/230 |
| 2015/0264580 A1* | 9/2015 | Iwai | H04W 72/0406 |
| | | | 370/329 |

* cited by examiner

FIG. 4A

MOBILE COMMUNICATION SYSTEM AND PRE-AUTHENTICATION FILTERS

CROSS-REFERENCE TO RELATED APPLICATIONS

This application is a National Entry Application of PCT application no PCT/CA2016/050872 filed on Jul. 25, 2016 and published in English under PCT Article 21(2), which itself claims benefit of U.S. provisional application Ser. No. 62/196,545, filed on Jul. 24, 2015. All documents above are incorporated herein in their entirety by reference.

FIELD OF THE INVENTION

The present invention relates to a mobile communication system and pre-authentication filters. In particular, the present application relates to methods and systems for acquiring credentials and accessing other specified services in a mobile system prior to the mobile part being authenticated.

BACKGROUND TO THE INVENTION

Prior art systems disclose applications and devices in a networked environment accessing an authenticated network using credentials which are previously known and in some cases stored on the device. One drawback of these access methods is that security can be compromised if the credentials are stolen or otherwise misacquired, or if the rights associated with the credentials change over time. This is especially a problem in mobile environments where the devices may be left in vehicles and the like and more easily accessible to those other than an authorized user.

SUMMARY OF THE INVENTION

In order to address the above and other drawbacks there is provided a method for providing a mobile client access to a ground network via a mobile network. The method comprises establishing a service connection between a mobile gateway in the mobile network and a fixed gateway in the ground network wherein the service connection is limited for use by at least one entitled communication type, providing to the mobile client a pre-authentication filter comprising the least one entitled communication type, the mobile client comparing a given communication type with the pre-authentication filter comprising the least one entitled communication type, and communicating between the mobile client and the ground network using the given communication type via the service connection and provided the given communication type matches the at least one entitled communication type.

Further, there is disclosed a method for providing a client in a mobile network access to a server in a ground network. The method comprises establishing a service connection between a mobile gateway in the mobile network and a fixed gateway in the ground network, the mobile network requesting and receiving credentials from a credential server located in the ground network via the service connection, establishing a limited access connection between the mobile network and the ground network using the received credentials, and communicating information between the client and the server using the limited access network.

There is additionally disclosed a system for providing communications between at least one client application and at least one server application. The system comprises a mobile part comprising a mobile gateway and at least one client device on which the at least one client application is operable and wherein each client application communicates using a respective IP address, port and protocol via the mobile gateway, a fixed part comprising a fixed gateway and at least one server on which the at least one server application is operable, a mobile network interconnecting the mobile part and the fixed part via the gateway and comprising a service connection and supporting a tunnel between the mobile gateway and the fixed gateway, and a pre-authentication filter provided to the mobile part by the mobile network and identifying at least one listed application, wherein when a communicating one of the at least one client application has data to transmit to a receiving one of the at least one server application and when the mobile part is authenticated with the mobile network, the mobile network relays the data to the receiving server application via the gateway and the tunnel and when the mobile part is not authenticated with the mobile network, and the communicating mobile application matches one of the at least one listed application, the mobile network relays the data to the receiving server application via the gateway and the service connection.

DETAILED DESCRIPTION OF THE ILLUSTRATIVE EMBODIMENTS

Figure 1:
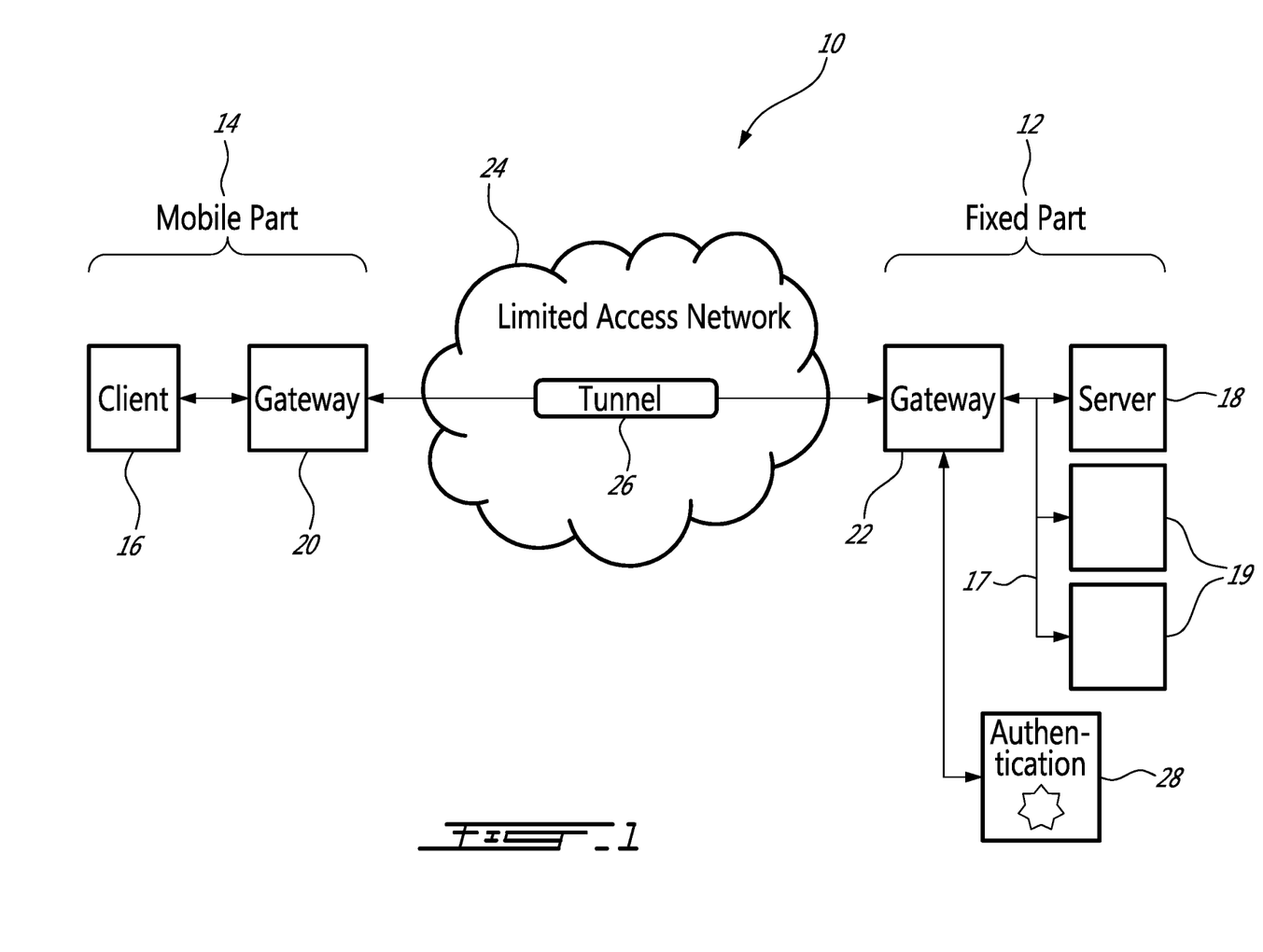
FIG. 1 is a schematic diagram of a communication system in accordance with an illustrative embodiment of the present invention.

Referring now to FIG. 1, a communication system in accordance with an illustrative embodiment of the present invention, and generally referred to using the reference numeral 10, will now be described. The communication system 10 comprises a fixed part 12, such as a corporate or municipal intranet or the like, and a mobile part 14. The mobile part 14 comprises at least one client as in 16 which is able to communicate with an intranet 17 comprising at least one server as in 18 and/or other network attached devices as in 19 located in the fixed part 12 and via a mobile gateway (router) 20, a fixed gateway 22 and a network 24, illustratively via a tunnel 26, such as to establish a Virtual Private Network (VPN), established between the mobile gateway 20 and the fixed gateway 22. Of note is that there are typically a plurality of mobile parts as in 14 in a given scenario, representing a plurality of mobile systems such as police cruisers, fire engines or the like, which are communicating with the fixed part 12. Note that although the mobile gateway 20 is shown as begin distinct from the client 16, in a given embodiment all or part of the functionality attributed to the mobile gateway 20 could be incorporated in the same device as the client 16.

Still referring to FIG. 1, in order to gain access to the tunnel 26 and ultimately the intranet 17 via the mobile router 20 and the network 24, the client 16 is first authenticated by an authentication entity 28, such as an X.500, Active Directory or LDAP server or the like, which is located in the fixed part 12, for example as part of a corporate IT infrastructure of the like, and of which the fixed gateway 22, server 18 and authentication entity 28 all form part. As known in the art, a common usage of LDAP is to provide a single sign on where one password for a user is shared between many services, such as applying a company login code to web pages (so that staff log in only once to company computers, and then are automatically logged into the company intranet).

Figure 2:
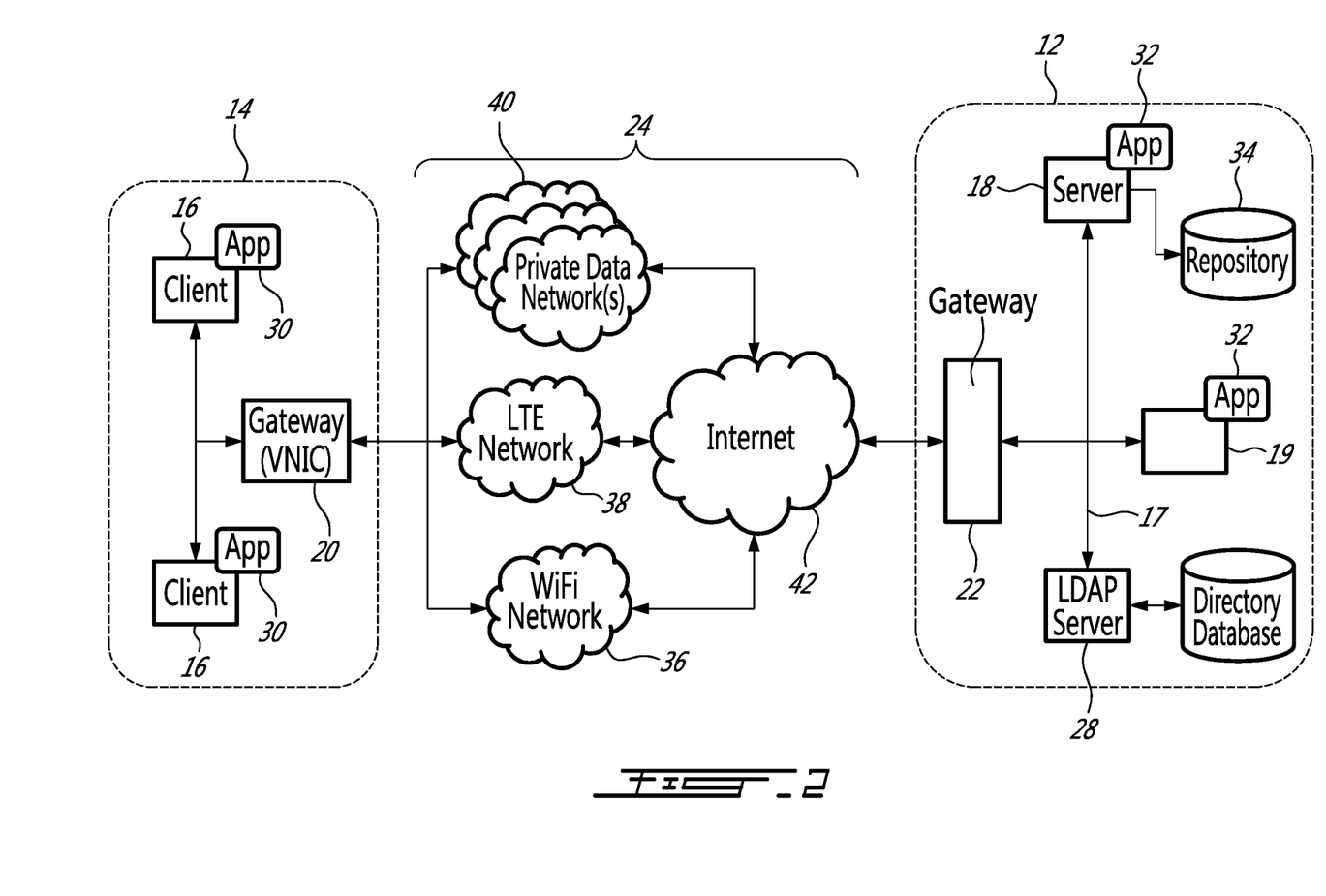
FIG. 2 is a detailed schematic diagram of a communication system in accordance with an illustrative embodiment of the present invention.

Referring now to FIG. 2 in addition to FIG. 1, the network 24 comprises a plurality of heterogeneous (sub)networks any one of which may potentially be used for a particular data communication. In particular, application(s) as in 30 running on clients (devices) as in 16 in mobile part 14 communicate with respective applications as in 32 running on associated server(s) 18 in the ground part 12, for example to retrieve data stored in a repository 34, such as an SQL data base of the like, illustratively via one of a WiFi network 36, a Long-Term Evolution (LTE) network 38 and one or more private data radio (PDR) networks 40, such as used typically by municipalities, police forces and fire departments for computer aided dispatch (CAD) and the like. The network 24 also typically comprises the Internet 42.

Still referring to FIG. 2, typically some types of networks, and in particular PDR networks as in 40, wish to restrict the type of data which is being communicated, for example due to bandwidth limits, security, or the like. As such, the mobile gateway 20 may limit a type of communication to a particular one of the WiFi network 36, LTE network 38 and PDR networks 40. The decision as to the type of communications which are entitled to use one or other of the WiFi network 36, LTE network 38 or PDR networks 40 may depend not only on the type of communications but also on the particular user or the like, which is subject to change from time to time and is typically reflected in access rights or the like which are maintained by the authentication entity 28, which is typically lodged within a corporate or municipal intranet. This is problematic as communications are typically initiated by clients in the mobile part, for example on being informed by the mobile gateway 20 that one or other of the WiFi network 36, LTE network 38 or PDR networks 40 is within range and available for communications.

Referring back FIG. 1 in addition to FIG. 2, in order to correctly provide a given communication access to the tunnel 26 which is supported by one or more of the WiFi network 36, LTE network 38 or PDR networks 40, credentials need to be established vis-à-vis a client's right to access the tunnel 26. One approach is to provide on each client device credentials which are sufficient to gain access to the tunnel 26. However, one of many problems with such an approach is that in the event the client device is lost or stolen a security breach may arise. Additionally, as credentials and/or the associated access rights may change from time to time in order to modify these access rights, new credentials must be provided on the client device.

Figure 3:
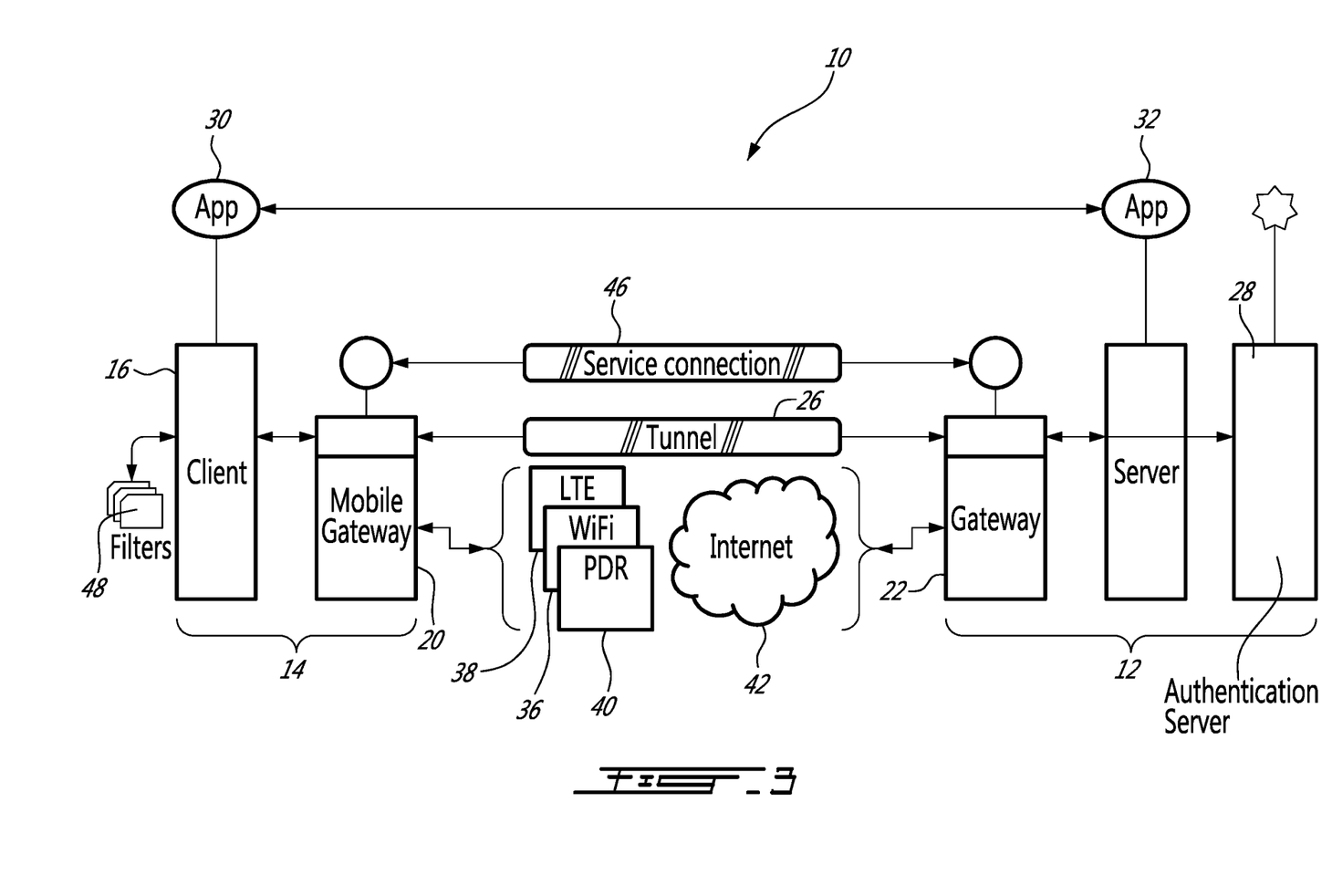
FIG. 3 is a diagram of a protocol architecture of a communication system in accordance with an illustrative embodiment of the present invention.

Referring now to FIG. 3, in order to use the tunnel 26 to transmit data between applications as in 30, 32 and over one of the WiFi network 36, LTE network 38 or PDR networks 40, the client 16 (or more typically a user associated with the client 16) must first register with the system and be authenticated. In order to allow some data packets to be relayed to the fixed gateway 22 from the client 16 prior to the client 16 being registered and authenticated, a service connection (or channel) 46 between the mobile gateway 20 and the fixed gateway 22 is established.

Still referring to FIG. 3, in order to aid the client in determining which type of communications are entitled to use the service connection 46, pre-authentication filters 48, which are provided/pushed to the mobile part 14 from time to time and typically at the outset of the registration process, are used. Illustratively the pre-authentication filters 48, which are typically in an Extensible Markup Language (XML) format or the like, comprise a list of one or more of a destination IP address or ranges of IP addresses, a port or ranges of ports, and a protocol. Illustratively the pre-authentication filters 48 do not specify communications (packets) to be blocked but rather communications which are entitled to use the service connection 46 prior to registration and authentication. As such, communications destined for an IP address, and in particular cases a particular port associated with that IP address, can be indicated as suitable for using the service connection 46 prior to completion of the registration process. Similarly, communications indicating the use of a particular protocol, which is indicated in the header of the packets, for example, can also be indicated as suitable for using the service connection 46 prior to completion of the registration process.

Figure 4A:
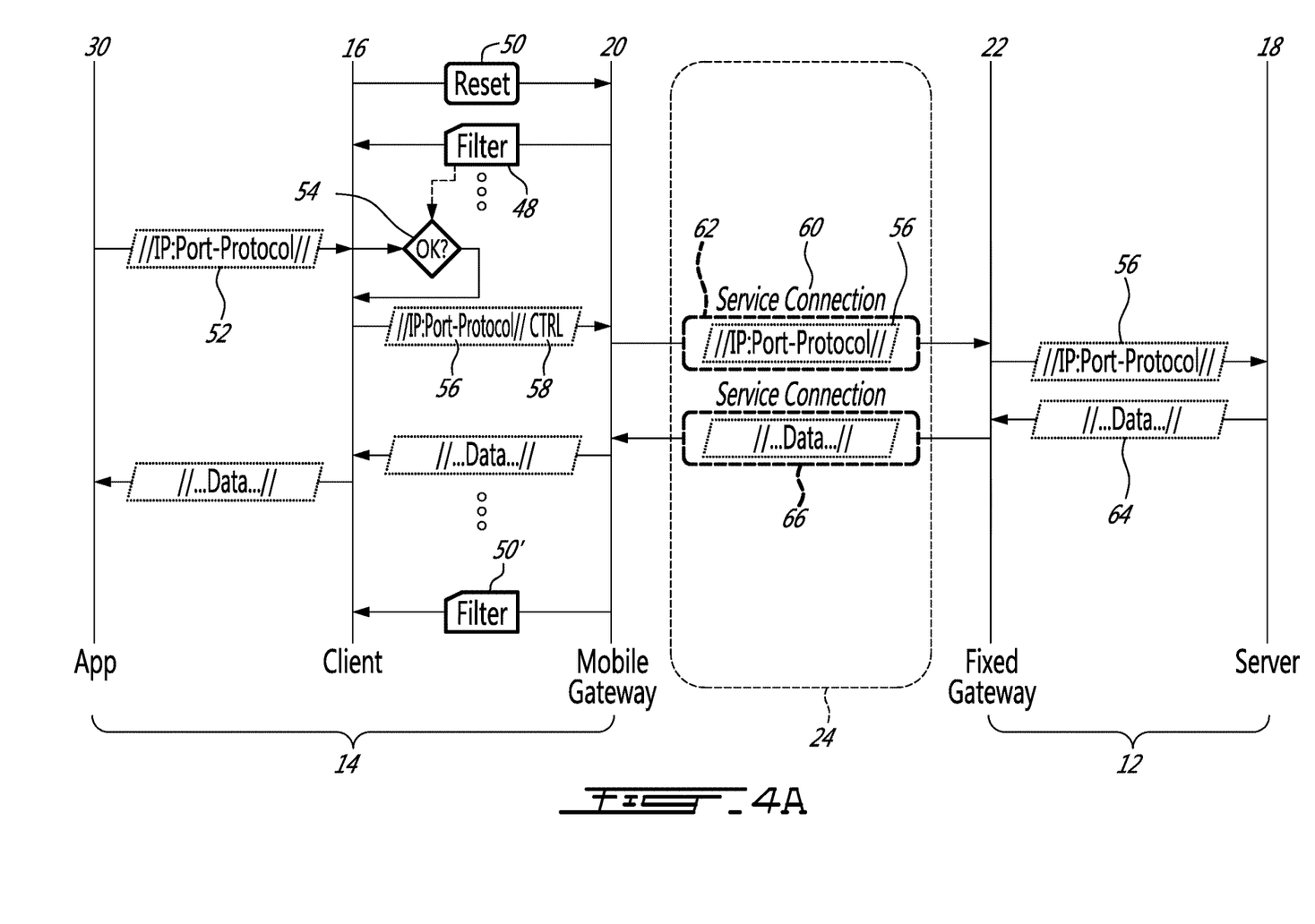
FIG. 4A is a first flow diagram representing data flows within a communication system and in accordance with an illustrative embodiment of the present invention.

Referring now to FIG. 4A, as discussed briefly above, typically the pre-authentication filters 48 are initially provided to the mobile part 14 by the fixed gateway 22 on reset 50 or start up or the like and as part of registration process. In a particular embodiment the fixed gateway 22, of which there may be a plurality in any given deployment and arranged as a "farm" (not shown), the filters 50, or rules, are stored in a storage service (also not shown) which is accessible by the fixed gateway(s) 22. Typically, all the fixed gateways 22 in a given deployment use the same set of rules. When registration between a mobile part 14 and the fixed part 12 is commenced, the gateway 22, which in the case of a mobile part 14 attempting to reregister with the fixed part 12 typically has access to a previous configuration of the mobile part 14, first checks to see if the filters/rules 50 have changed in the interim and in the positive provides a current version of the filters/rules 50 to the mobile part 14. The current version of the filters/rules 50 are then stored in the mobile part 14 for subsequent use as described below. Updated filters 50' may also be provided from time to time to reflect changing policies and the like.

Still referring to FIG. 4A, If an application 30 in the mobile part 14, for example, attempts to communicate 52 with a server 18 in the fixed part 12 prior to completion of authentication of the mobile part 14 with the fixed part 12, packets are first checked 54 versus the pre-authentication filters 48 and provided they conform to or match at least one entry in the pre-authentication filter 48 are transmitted illustratively as a packet 56 to the mobile gateway 20 and including a control header 58 indicating that a service connection 60 can be used. The packet 56 is re-encapsulated in a system packet 62 for transmission to the fixed gateway 22 using the service connection 60 and via the network 24. The fixed gateway 22 relays the packet 56 to its destination, for example an LDAP or directory server or the like or another allowed service, such as a web portal for Information (IT) Technology support or the like (for example so a user can resolve problems related to registering with the system or the like). The server 18 can respond to the application 30, for example, by transmitting data as in 64 using a similar service connection 66 and via the network 24.

Figure 4B:
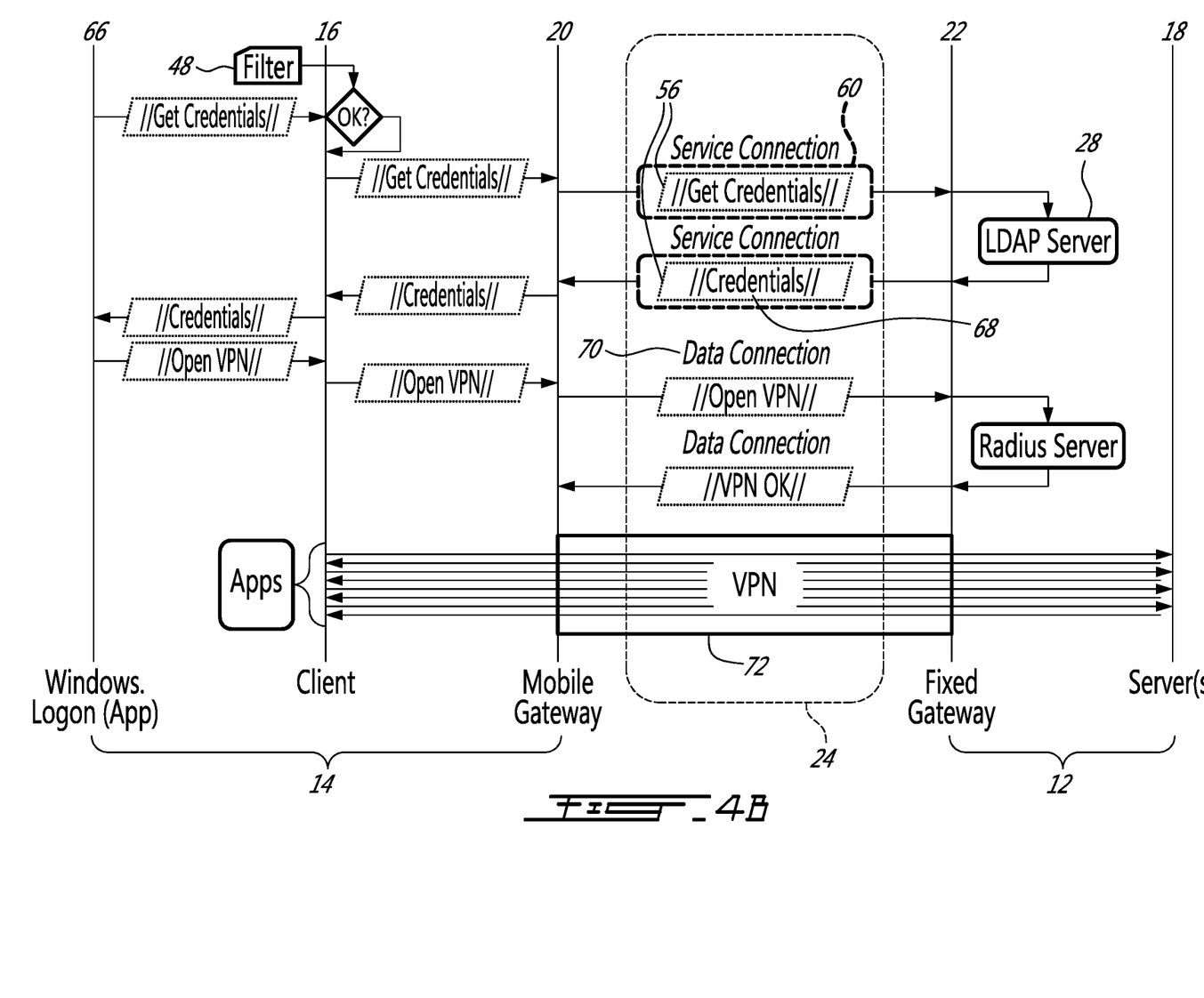
FIG. 4B is a second flow diagram representing data flows within a communication system and in accordance with an illustrative embodiment of the present invention.

Referring now to FIG. 4B, as discussed above credentials necessary to access the tunnel 26 are illustratively retrieved from an authentication provider such as an LDAP server 28 or the like which is located in the fixed part 12 of the system 10 and generally not readily accessible to the mobile part 14. In order to facilitate the acquisition of credentials by the mobile part 14 for accessing data communications to the fixed part 12 via the mobile network 24, an entry in the pre-authentication filter 48 will identify communications destined for the LDAP server 28. As such, an application such as windows logon 66 which requests authentication via the LDAP server 28, and following verification by the pre-authentication filters 48 may take advantage of the service connection 60 to transmit and receive packets as in 56 respectively requesting and containing the credentials 68. Once the credentials 68 have been received they may be used by the mobile part 14 to gain access to data connections as in 70 via the tunnel 26 and the mobile network 24. The data connections as in 70 may be used, for example, to establish a Virtual Private Network (VPN) 72 between the mobile part 14 and the fixed part 12, and such that mobile applications as in 72 and their associated clients 16 in the mobile part 14 can communicate directly with servers 18 and their associated fixed applications (not shown) in the fixed part 12, and vice versa.

Although the present invention has been described herein above by way of specific embodiments thereof, it can be modified without departing from the spirit and nature of the subject invention as defined in the appended claims.

We claim:

1. A method for providing a mobile client on a mobile device access to a ground private network via a mobile private network, the mobile device previously registered within the ground private network and provided a first pre-authentication filter, comprising:
    comparing said first pre-authentication filter with a current pre-authentication filter;
    on determining a change between the first pre-authentication filter and a current pre authentication filter:
    establishing a service connection between the mobile private network and the ground private network wherein said service connection is limited for use by at least one current predetermined entitled communication type;
    the mobile private network providing to the mobile client said current pre-authentication filter comprising said least one current predetermined entitled communication type;
    the mobile client comparing a given communication type with said current pre-authentication filter comprising said least one current predetermined entitled communication type; and
    communicating between the mobile client and the ground private network using said given communication type via said service connection and provided said given communication type matches said at least one current predetermined entitled communication type.

2. The method of claim 1, wherein the mobile private network comprises a mobile gateway and the ground private network comprises a fixed gateway and said service connection is established between said mobile gateway and said fixed gateway.

3. The method of claim 1, wherein said at least one current predetermined entitled communication type is characterized by one of a destination IP address, a port, a range of ports, a communication protocol and combinations thereof.

4. The method of claim 1, wherein said comparing is carried out following a mobile network reset.

5. The method of claim 1, wherein said current pre-authentication filter is updated from time to time.

6. The method of claim 1, wherein said current pre-authentication filter is in an XML format.

7. A method for providing a client on a mobile device in a mobile private network access to a server in a ground private network, comprising:
    establishing a service connection between the mobile private network and the ground private network wherein said service connection is limited for use by at least one predetermined entitled communication type, and further wherein said at least one predetermined entitled communication type comprises an authentication communication type and wherein credentials are requested and received using said authentication communication type;
    the mobile private network requesting and receiving credentials from a credential server in the ground private network via said service connection;
    establishing a point-to-point connection between the mobile private network and the ground private network using said received credentials; and
    communicating information between the client and the server using said point-to-point connection.

8. The method of claim 7, wherein the mobile private network comprises a mobile gateway and the ground private network comprises a fixed gateway and said service connection and said point-to-point connection are established between said mobile gateway and said fixed gateway.

9. The method of claim 7, wherein said point-to-point connection is encrypted.

10. The method of claim 7, wherein said point-to-point connection comprises a Virtual Private Network (VPN) point-to-point connection and said VPN connection is established between a first VPN tunnel endpoint in the mobile private network and a second VPN tunnel endpoint in the ground private network.

11. The method of claim 7, further comprising providing to the mobile client a pre-authentication filter comprising said least one entitled communication type and wherein prior to requesting said credentials, said the mobile client compares said authentication communication type with said pre-authentication filter.

12. A system for providing communications between at least one client application and at least one server application; the system comprising:
    a mobile part comprising a mobile private network and at least one client device on which the at least one client application is operable and wherein each client application communicates using a respective IP address, port and protocol via said mobile gateway;
    a fixed part comprising a fixed private network and at least one server on which the at least one server application is operable;
    a mobile network interconnecting said mobile private network and said fixed private network and comprising a service connection and supporting a point-to-point connection between said mobile private network and said fixed private network;
    a pre-authentication filter provided to the mobile private network by the mobile network and identifying at least one predetermined listed application; and
    wherein when a communicating one of the at least one client application has data to transmit to a receiving one of the at least one server application and when said mobile private network is authenticated with said mobile network, said point-to-point connection is selected to relay said data to said receiving server application and when said mobile private network is not authenticated with said mobile network, and the communicating mobile application matches one of said at least one predetermined listed application, said service connection is selected to relay said data to the receiving server application.

13. The system of claim 12, wherein said mobile private network further comprises a mobile gateway and said fixed private network further comprises a fixed gateway, wherein said service connection and said point-to-point connection are between said mobile gateway and said fixed gateway.

14. The system of claim 12, wherein said pre-authentication filter is in an XML format.

15. The system of claim 12, wherein each of said at least one listed applications is identified by at least one of an IP address, port and protocol and each of the mobile client application comprises an IP address, port and protocol.

16. The system of claim 12, wherein the at least one client application is a web browser and the at least one server application is a web server.

17. The system of claim 12, wherein said point-to-point connection is a VPN connection connecting said mobile private network and said fixed private network.

18. The system of claim 12, wherein said fixed private network comprises an authentication server, said mobile private network comprises an authenticating one of the at least one mobile client comprising an IP address, port and protocol which matches said at least one IP address, port and protocol of said at least one listed application and wherein said mobile private network is authenticated by said authenticating mobile client requesting and receiving credentials from said authentication server using said one service connection.

19. The system of claim 18, wherein said credentials are used to establish said point-to-point connection between said mobile private network and said fixed private network.

20. The system of claim 18, wherein said authentication server comprises an LDAP server and said authenticating mobile client comprises a Windows Logon component.

21. The system of claim 12, wherein said mobile network comprises at least one of a WiFi network, a Long-Term Evolution (LTE) network and one or more private data radio (PDR) networks.

* * * * *